Jan. 14, 1947.  J. F. R. FLOYD  2,414,370
SHIELDED THERMOCOUPLE FOR USE IN HIGH VELOCITY FLUID STREAMS
Filed May 11, 1943

INVENTOR.
J. F. RABARDY FLOYD
BY
ATTORNEY

Patented Jan. 14, 1947

2,414,370

UNITED STATES PATENT OFFICE 2,414,370

SHIELDED THERMOCOUPLE FOR USE IN HIGH-VELOCITY FLUID STREAMS

J. F. Rabardy Floyd, Baltimore, Md., assignor to The Glenn L. Martin Company, Middle River, Md., a corporation of Maryland Application May 11, 1943, Serial No. 486,508

4 Claims. (Cl. 136—4)

This invention relates to a shielded thermocouple for the determination of the true temperature of gas in a duct.

In order to determine the temperature of a gas flowing in a duct, it is necessary that the gas be brought in contact with a thermocouple without any adiabatic change due to bringing the gas to rest. The thermocouple must be completely shielded from radiation of heat to or from the surrounding duct structure.

The thermocouple of this invention is intended to measure temperatures in the order of 1300° F. and velocities of gas flow of around 300 miles per hour, such as will be encountered in the exhaust of a 2000 to 3000 H. P. internal combustion engine, or in the discharge of jet propulsion motors.

In ordinary installations where the thermocouples are placed in a gas stream in a duct, such as the exhaust manifold of an engine where the gases are hotter than the surrounding walls, the thermocouple continuously radiates heat to the surrounding walls. This gives an inherent error in the temperature measurement. Where it is desired to make a measurement of temperature under conditions where the hot gases are flowing at a rapid rate, there is a further error in the thermocouple reading due to the energy imparted to the thermocouple by the inpinging of the high velocity gases on the thermocouple. A further error is introduced into thermocouple reading when an ordinary thermocouple is inserted in the gas stream due to the turbulence caused in the flow of gas.

By this invention, each of the above possible errors have been eliminated.

The structure of this invention is such that turbulence is prevented in the gas flow while the thermocouple reading is being taken.

Another object of this invention is to bring the hot gas into contact with the thermocouple at a relatively low velocity.

A further object of this invention is to shield the thermocouple from radiation to or from surrounding structure.

Further and other objects will become apparent from the description of the accompanying drawing which forms a part of this disclosure and in which like numerals refer to like parts.

Figure 1:
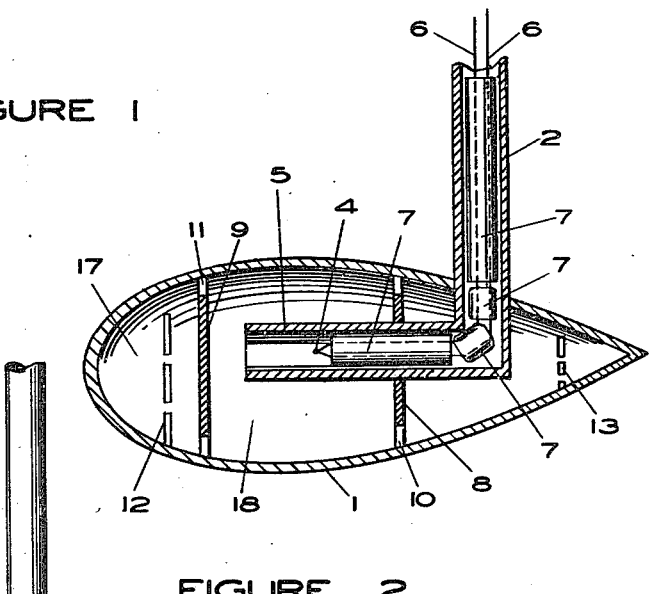
Figure 1 is a sectional view through the thermocouple structure.
Figure 2:
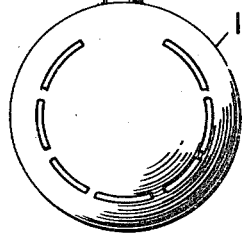
Figure 2 is an end view of the same.

The drawing illustrates a thermocouple structure comprising a streamlined hollow shell 1, adapted to be inserted in a flow of hot gas. Pipe 2, also streamlined to minimize resistance to flow furnishes a support for the housing.

The thermocouple 4, is positioned within the housing in tubular shield 5 which is in open communication with pipe 2. Shield 5 prevents radiation of heat to or from thermocouple 4 due to any temperature gradient around the thermocouple housing. The thermocouple 4 and leads 6 are spaced and supported by insulating members 7 which are usually in the form of glass beads or other refractory material.

Tube 5 is located and supported by partition 8 extending transversely of the housing. This partition has a plurality of openings 10 adjacent the periphery for the passage of gas. Partition 9 also extends transversely of the housing forming with partition 8 a chamber within the hollow body, into which tube 5 extends. Partition 9 has a plurality of openings 11 around its periphery.

The streamlined housing has a row of gas inlet openings 12 adjacent the front of the shell and a row of outlet openings 13 adjacent the rear end of the shell. The proper location and extent of the inlet and outlet openings is quite important to the functioning of the thermocouple.

In the illustration, the rows of inlet and outlet openings are shown extending tranversely of the snell. The location of these rows of holes are determined from the aerodynamics of the streamlined body.

Figure 3:
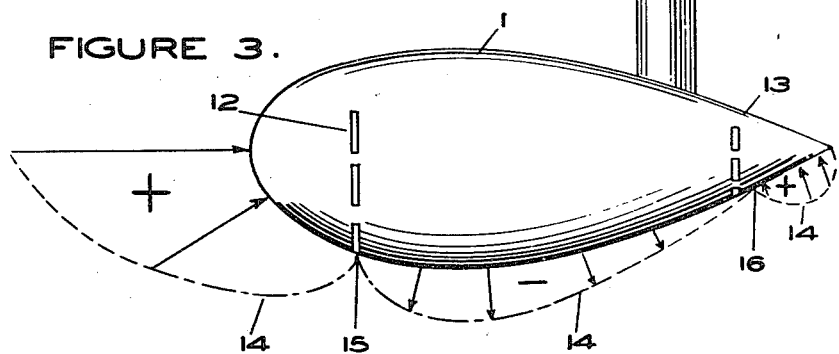
Figure 3 is an elevational view showing the pressure distribution curve around the housing.

For the body shown in Figure 3, the pressure curve has been determined from wind tunnel tests and is shown by the broken line 14. It varies from a high positive pressure at the forward end of the body to zero pressure at point 15, then to a negative pressure as indicated, to another zero point 16, after which it becomes positive to the rear of the body. This pressure curve is uniform around the body except on top, where the gas flow, and therefore the pressure curve, is disturbed by the supporting member 2. As a result, the rows of openings extend around the periphery of the body only as far as the pressure curve 14 is undisturbed and remains as shown. The rows of openings therefore do not extend over the top of the body.

An inspection of the drawing, in view of the pressure curve discussed above, will show that the inlet openings 12 are located at the point of zero pressure. The outlet openings 13 are located slightly inside the zone of negative pressure. From the locations of the openings, it will be apparent that a small sample of the gas from the gas stream will be induced to flow through the inlet openings 12 into chamber 17, around baffle 9, into chamber 18, where it imparts its energy to the thermocouple in open-ended tube 5. It is not necessary that the gas flow into the open end of tube 5 to the thermocouple and out again because the kinetic energy of the gas passing through the housing in the proximity of the thermocouple will be transmitted to the thermocouple by molecular action in accordance with the kinetic theory of gases. The gas will flow from the chamber 18 around baffle 8 and through outlets 13.

It can be readily seen from the drawing that the inlet and outlet openings can be selected, relative to the pressure distribution on the surface of the shell, so that a small sample of the gas from the stream will pass through the inside of the shell at a very low velocity thus permitting the thermocouple to give an indication of the true temperature of the gas stream. The main object is to locate the openings in such position that will accomplish this result with the least possible disturbance of the flow of gas.

It is to be understood that certain changes, alterations, modifications and substitutions can be made without departing from the spirit and scope of the appended claims.

I claim as my invention:

1. A temperature measuring device for use in high velocity fluid streams comprising, a streamlined shell, a thermocouple positioned within said shell, baffles intermediate said thermocouple and the shell walls, orifice means so located in said body to introduce a sample of the fluid from the fluid stream into the proximity of said thermocouple, said thermocouple being located out of the direct flow path of said fluid to prevent any adiabatic change due to impact of the gas on the thermocouple.

2. A temperature measuring device comprising a streamlined hollow body, means to support said body in a high velocity fluid stream, a thermocouple positioned within said hollow body, orifice means to introduce a sample of the fluid into the proximity of said thermocouple, comprising apertures in the shell so placed with respect to the known pressure distribution curve of the streamlined shell that the fluid flows through the shell under a very low pressure differential and at a very low velocity, said thermocouple being located out of the direct flow path of the gas to eliminate any temperature rise of the thermocouple due to the impingement of the gas stream on the thermocouple.

3. A temperature measuring device comprising a streamlined hollow body, having a known pressure distribution curve, a thermocouple positioned within said hollow body, apertures in said body so placed with respect to the pressure distribution on the surface of said body that some are located in zones of substantially zero pressure and some located in zones of slightly negative pressure whereby fluid is caused to flow through said body.

4. A temperature measuring device comprising a streamlined hollow body, having a known pressure distribution curve, a thermocouple positioned within said body, apertures in one end of said body in the zone of substantially zero pressure and other apertures adjacent the opposite end of the body in a zone of slightly negative pressure whereby a flow of the surrounding fluid is induced through said body.

J. F. RABARDY FLOYD.